(12) United States Patent
Kato

(10) Patent No.: US 6,271,774 B1
(45) Date of Patent: Aug. 7, 2001

(54) PICTURE DATA PROCESSOR, PICTURE DATA DECODER AND PICTURE DATA ENCODER, AND METHODS THEREOF

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/274,097

(22) Filed: Mar. 22, 1999

(30) Foreign Application Priority Data

Mar. 24, 1998 (JP) .................................................. 10-075953

(51) Int. Cl.⁷ ....................................................... H03M 5/00
(52) U.S. Cl. ............................. 341/52; 375/240; 348/384
(58) Field of Search .................................. 341/55, 67, 52, 341/56, 57, 60, 143; 375/240; 348/411, 384; 386/111

(56) References Cited

U.S. PATENT DOCUMENTS 5,563,660 * 10/1996 Tsukagoshi ........................... 348/384
6,009,236 * 12/1999 Mishima et al. ..................... 386/111
6,088,396 * 7/2000 Takahashi ............................ 375/240

* cited by examiner

*Primary Examiner*—Brian Young
*Assistant Examiner*—John Nguyen
(74) *Attorney, Agent, or Firm*—Frommer Lawrence & Haug, LLP.; William S. Frommer; Darren M. Simon

(57) ABSTRACT

A picture data processor, a picture data decoder and a picture data encoder, and methods thereof, are capable of surely decoding and reencoding inputted coded data without delaying. Coded data D1 in order of encoding which is generated by encoding original picture data in order of display, for each prescribed data unit by a prescribed coding type I, P or B and in order of prescribed encoding, is decoded in order of this encoding. The decoded picture data D110 is outputted in order of decoding to be reencoded in order of decoding. And the reencoded data is outputted in order of encoding. Thereby, the inputted coded data D1 can be surely decoded and reencoded without delaying.

6 Claims, 11 Drawing Sheets

FIG. 5A (PRIOR ART) INPUT OF BIT STREAM(D1) TO DECODER    I0 P3 B1 B2 P6 B4 B5 P9 B7 B8 .....

FIG. 5B (PRIOR ART) OUTPUT OF PICTURES(D10) FROM DECODER    I0 B1 B2 P3 B4 B5 P6 B7 B8 P9 .....

FIG. 5C (PRIOR ART) INPUT OF PICTURES(D10) TO ENCODER    I0 B1 B2 P3 B4 B5 P6 B7 B8 P9 .....

FIG. 5D (PRIOR ART) OUTPUT OF BIT STREAM(D34) FROM ENCODER    I0 P3 B1 B2 P6 B4 B5 P9 B7 B8 .....

PICTURE DATA PROCESSOR, PICTURE DATA DECODER AND PICTURE DATA ENCODER, AND METHODS THEREOF

BACKGROUND OF THE INVENTION

1. Field of the Invention

This invention relates to a picture data processor, picture data decoder and picture data encoder, and methods thereof, and more particularly, is preferably applicable to the case of decoding and reencoding picture data encoded by the moving picture experts group (MPEG) standard.

2. Description of the Related Art

In a picture data encoder for encoding a motion picture based on, for example, the moving picture experts group (MPEG) standard, encoding is performed with, for example, fifteen frames of motion picture data as one processing unit called a group of pictures (GOP).

In one GOP, there are coding types for each frame, called I-picture (intra-picture: intra-frame coded picture), P-picture (predictive-picture: inter-frame forward direction predictive-encoded picture) and B-picture (bidirectional predictive-picture: bidirectionally predictive-coded picture).

Specifically, as shown in FIG. 1, the I-picture (picture IO) is to keep independence of the GOP, and is encoded in the picture. The P-pictures (pictures P3, P6) are predictive-encoded in the forward direction from the I-picture or P-picture. In this connection, the I-picture and P-picture are encoded in the same sequence as an original picture.

The B-pictures (pictures B1, B2, B4, B5) are bidirectionally predictive-encoded from the I-picture or P-picture. Accordingly, when decoding picture data compressively-encoded, the I-picture is solely decoded, but the P-picture and B-picture its picture data are not decoded solely.

FIG. 2A shows the input order of a motion picture signal to an encoder (that is, the displaying order of the motion picture signal). The first frame picture signal (picture IO) is a picture signal before being encoded as I-picture, and the following second frame picture signal (picture B1) is a picture signal before being encoded as B-picture. In this connection, a number added to each picture type (I, P, B) represents the displaying order.

The motion picture signal successively inputted to the encoder in this manner is encoded according to each picture type. In this case, since the B-pictures (pictures B1 and B2) are generated referring to the I-picture (picture IO) and P-picture (picture P3), the B-pictures (pictures B1 and B2) are stored in a frame memory until the P-picture (picture P3) to be a reference is encoded.

As the above, the encoder needs frame memories as many as the B-pictures between the I-picture (or P-picture) and P-picture. In the case of FIGS. 2A to 2D, there is a space of three pictures between the I-picture (or P-picture) and P-picture. If representing this as M=3, the number of pieces of B-pictures between the I-picture (or P-picture) and P-picture becomes M−1.

Furthermore, if encoding for each picture type is performed in the encoder, each picture is to be outputted in a sequence shown in FIG. 2B. In this case, since the B-pictures (pictures B1 and B2) are temporarily stored in the frame memory before being encoded and the P-picture (picture P3) is previously encoded, coded data (bit stream) is outputted at timing delayed for three frames from the picture IO to the picture P3 of the input picture signal (FIG. 2A) from the input of the picture signal.

Therefore, in the encoder, the inputted motion picture signal is outputted in the state where its frame sequence (the displaying order) has been rearranged in order of encoding by that encoding processing.

Thus coded bit stream (FIG. 2B) is inputted to a decoder through a prescribed transmission line and decoded. In this case, as shown in FIG. 2C, pictures are inputted in order of pictures outputted from the encoder as described above with reference to FIG. 2B.

In the decoder, the inputted bit stream is rearranged in order of display to obtain a motion picture signal shown in FIG. 2D, and outputs this as a decoded picture signal. In this case, in the decoder, since the inputted bit stream (FIG. 2C) is not in order of display, a process to rearrange the inputted bit stream in order of display is necessary. Accordingly, in the decoder, a delay time for one frame is generated after the bit stream was inputted until this is outputted as the decoded picture signal.

By the way, when changing the bit rate of a bit stream once encoded, or the like, it is needed to temporarily decode the encoded bit stream and reencode the decoded picture signal at a different bit rate. As a method of reencoding thus decoded picture signal, a decoding and encoding apparatus 1 as shown in FIG. 3 can be considered.

Referring to FIG. 3, the decoding and encoding apparatus 1 temporarily decodes an encoded bit stream D1 with a decoder 2, and reencodes a decoded picture signal D10 thus decoded with an encoder 20, to obtain a bit stream D34.

As shown in FIG. 4, this decoder 2 inputs the inputted bit stream D1 to a variable-length decoding part 4 via a buffer 3. The variable-length decoding part 4 performs variable-length decoding on the bit stream D1 and supplies this to an inverse quantizing part 5. The inverse quantizing part 5 performs inverse quantizing on the output of the variable-length decoding part 4 to restore a discrete cosine transform (DCT) coefficient sequence D5. This is subjected to inverse DCT processing in an inverse DCT part 6. Thus, difference data according to the picture type is outputted from the inverse DCT part 6 to an arithmetic part 7.

Here, when decoding the I-picture first inputted as the bit stream D1, since the I-picture is data intra-frame-encoded, picture data for one frame is outputted from the inverse DCT part 6. This picture data is supplied to the following picture sequence rearranging part 10 as decoded picture data D7 as well as being stored in a frame memory 8 as reference picture data.

A motion compensating part 9 performs motion compensating on the reference picture data stored in the frame memory 8 based on motion vector information (not shown in figure) transmitted from the encoder along with the bit stream D1, and supplies this to the arithmetic part 7 as predictive picture data D9.

The arithmetic part 7 adds the difference data D6 outputted from the inverse DCT part 6 to the predictive picture data D9, and obtaining the decoded picture data D7 of a new frame (picture). This decoded picture data D7 is supplied to the picture sequence rearranging part 10, and at the same time, it is stored in the frame memory 8 as reference picture data to be a reference picture for the following frame (picture).

In this connection, when the bit stream D1 shown in FIG. 5A is inputted to the decoder 2, the picture P3 is restored with the picture IO previously-decoded as a reference picture, and the pictures B1 and B2 are restored with the pictures IO and P3 previously-decoded as reference pictures.

Thus, each of pictures forming the bit stream D1 is decoded and then rearranged in order of display in the picture sequence rearranging part 10, so that the decoded picture signal D10 shown in FIG. 5B can be obtained. This decoded picture signal D10 is outputted from the picture sequence rearranging part 10 of the decoder 2, and supplied to the encoder 20 (FIG. 3).

In this connection, in the variable-length decoding part 4 of the decoder 2, the picture type (I-picture, P-picture, B-picture) of each of the pictures forming the inputted bit stream D1 is read out from header information corresponding to each picture, and this is supplied to the encoder 20 (FIG. 3) as picture coding type information D40. The encoder 20 encodes the decoded picture signal D10 into the same picture type as the picture type encoded in the bit stream D1 based on the picture coding type information D40.

FIG. 6 shows the configuration of the encoder 20. The decoded picture signal D10 outputted from the decoder 2 (FIG. 4) is stored in a frame memory 21 of the encoder 20. A motion predicting part 22 detects motion vector information D21 between two frames (pictures) stored in the frame memory 21, and supplies this to a motion compensating part 31.

The motion compensating part 31 performs motion compensating processing on the reference pictures stored in a frame memory 30 at this time using the motion vector information D21, and generating predictive picture data D31, supplies this to an arithmetic part 24.

On the other hand, the picture data of each picture of the decoded picture signal D10 in which the motion vector has been detected is supplied to a picture sequence rearranging part 23. The picture sequence rearranging part 23 rearranges pictures of the decoded picture signal D10 shown in FIG. 5C, for example, so as to form such a picture sequence that the I-picture (picture I0) and P-picture (picture P3) being the reference pictures are encoded before the B-pictures (pictures B1 and B2).

The decoded picture signal D23 in which the pictures have been rearranged in this manner is supplied to the arithmetic part 24, and a difference from the predictive picture data D31 supplied from the motion compensating part 31 is calculated. This difference data D24 is supplied to a DCT part 25 to be subjected to discrete cosine transform (DCT) processing. The DCT part 25 generates a DCT coefficient sequence D25 by the DCT processing, and supplies this to a quantizing part 26. The quantizing part 26 quantizes the DCT coefficient sequence D25 to generate quantized data D26, and supplies this to a variable-length encoding part 33 and an inverse quantizing part 27.

The inverse quantizing part 27 performs inverse quantizing on the quantized data D26 to restore a DCT coefficient sequence D27. The DCT coefficient sequence D27 is supplied to an inverse DCT part 28 to be subjected to inverse DCT processing. Thus, the inverse DCT part 28 restores difference data D28 according to the picture type, and outputs this to an arithmetic part 29.

The arithmetic part 29 performs addition calculation of the predictive picture data D31 outputted from the motion compensating part 31 to the difference data D28, and generating reference picture data D29, stores this in a frame memory 30.

In this manner, the difference data quantized via the DCT part 25 and quantizing part 26 is restored by the inverse quantizing part 27 and the inverse DCT part 28 as the difference data D28. This is added to the predictive picture data D31 in the arithmetic part 29, so that it is to be the reference picture data D29. Thereby, a reference picture for the following frame (picture) is prepared in the frame memory 30.

Here, the encoder 20 inputs the picture coding type information D40 from the decoder 2 (FIG. 4), and encodes each frame (picture) of the decoded picture signal D10 according to each picture type specified by the picture coding type information D40. That is, each frame of the decoded picture signal D10 outputted from the decoder 2 has been encoded according to any type of the I-picture, P picture and B-picture, before being decoded in the decoder 2. This picture type is inputted to the encoder 20 as the picture coding type information D40 along with a corresponding frame number in the decoding processing in the decoder 2.

Thus, the encoder 20 obtains the picture type information corresponding to the frame of the inputted decoded picture signal D10, and performs encoding according to the picture type. For example, if the picture type specified to the frame of the inputted decoded picture signal D10 is the I-picture, the control part of the encoder 20 (not shown in figure) performs encoding processing on each of macro blocks forming the frame of the decoded picture signal D10 in an intramode.

Specifically, in the intramode, the arithmetic part 24 transmits the decoded picture signal D23 outputted from the picture sequence rearranging part 23 as it is. Accordingly, the difference data D28 outputted via the DCT part 25, quantizing part 26, inverse quantizing part 27 and inverse DCT part 28 becomes picture data for one frame (picture). This is added to the predictive picture data D31 supplied from the motion compensating part 31, and stored in the frame memory 30 as reference picture data.

At this time, the quantized data D26 of the I-picture outputted from the quantizing part 26 is supplied to the variable-length encoding part 33. The variable-length encoding part 33 performs the variable-length encoding processing using a prescribed conversion table on the quantized data D26, and generating variable-length-coded data D33, supplies this to a buffer 34. The buffer 34 outputs the variable-length coded data D33 at a prescribed bit rate.

Thus, a bit stream D34 at the prescribed bit rate is outputted from the encoder 20. As a result, the decoded picture signal D10 inputted to the encoder 20 is reencoded into the picture type (I-picture) before being decoded in the decoder 2, provided prior to the encoder 20, and the reencoded data is outputted.

On the other hand, if the picture type specified to the decoded picture signal D10 to be inputted to the encoder 20 is the P-picture, the control part of the encoder 20 (not shown in figure) performs the encoding processing on each of the macro blocks forming the frame of the decoded picture signal D10 in a forward-directional predictive mode.

In the forward-directional predictive mode, the arithmetic part 24 performs subtraction processing on the decoded picture signal D23 outputted from the picture sequence rearranging part 23, using the forward-directional predictive picture data D31 supplied from the motion compensating part 31. The forward-directional predictive picture data D31 is calculated by that the reference picture data composed of the I-picture or P-picture stored in the frame memory 30 is subjected to the motion compensating based on the motion vector information D21. In this manner, the arithmetic part 24 calculates a difference between the forward-directional predictive picture data D31 generated based on the I-picture (or P-picture) stored in the frame memory 30 and the decoded picture signal D23, and generating difference data forming the P-picture, transmits this to the DCT part 25.

At this time, the quantized data D26 of the P-picture outputted from the quantizing part 26 is outputted via the variable-length encoding part 33 and the buffer 34 as the bit stream D34. Thereby, the decoded picture signal D10 to be inputted to the encoder 20 is reencoded into the picture type (P-picture) before being decoded in the decoder 2 provided prior to the encoder 20, and the reencoded data is outputted.

On the other hand, if the picture type specified to the decoded picture signal D10 to be inputted to the encoder 20 is the B-picture, the control part of the encoder 20 (not shown in figure) performs the encoding processing on each of the macro blocks forming the frame of the decoded picture signal D10 in a bidirectional predictive mode.

In the bidirectional predictive mode, the arithmetic part 24 performs subtraction processing on the decoded picture signal D23 outputted from the picture sequence rearranging part 23, using the bidirectional predictive picture data D31 supplied from the motion compensating part 31. The bidirectional predictive picture data D31 are calculated by defining pictures in the past and future (I-picture or P-picture) with respect to a frame to be encoded at this time as reference pictures and performing the motion compensating on the reference picture data stored in the frame memory 30 based on the motion vector information D21. Then, the arithmetic part 24 subtracts the mean value of each predictive picture data in the forward direction and reverse direction generated based on the past I-picture or P-picture and the future I-picture or P-picture stored in the frame memory 30, and obtaining the difference data D24 as a predictive residual, and transmits this to the DCT part 25.

At this time, the quantized data D26 of the B-picture outputted from the quantizing part 26 is outputted via the variable-length encoding part 33 and buffer 34 as the bit stream D34. Thereby, the decoded picture signal D10 inputted to the encoder 20 is reencoded into the picture type (B-picture) before being decoded in the decoder 2 provided prior to the encoder 20, and the reencoded data is outputted.

In this manner, after each of the pictures forming the bit stream D1 (FIG. 4) was temporarily decoded in the decoder 2, if it is reencoded in the encoder 20, it becomes the same picture type, and the deterioration of image quality owing to reencoding can be avoided.

By the way, in the decoding and encoding apparatus 1 shown in FIG. 3, for example, if the bit stream D1 shown in FIG. 5A is inputted to the decoder 2, all spaces between the I-picture (or P-picture) and the P-picture of this bit stream D1 is unified into M=3 in order of display. Therefore, the decoded picture signal D10 in the displaying order obtained by decoding the bit stream D1 is in the structure that two pieces of B-pictures (pictures B1 and B2) are inserted between the picture I0 and the picture P3, as shown in FIG. 5B.

If the decoded picture signal D10 having such structure is inputted to the encoder 20 as shown in FIG. 5C, the encoder 20 encodes this and outputs the bit stream D34 delayed for three frames based on M=3, as shown in FIG. 5D. This bit stream D34 is encoded based on the picture coding type information D40, so that it has the same picture structure as the bit stream D1 inputted to the decoder 2.

On the other hand, as the bit stream D1 to be inputted to the decoder 2 of the decoding and encoding apparatus 1 shown in FIG. 3, if the GOP structure of the bit stream is changed by editing or if two bit streams different in the GOP structure have been connected is inputted, the space between the I-picture (or P-picture) and the P-picture of the inputted bit stream D1 (i.e., the value of M) may change on the way.

That is, if the edited bit stream D1 shown in FIG. 7A is inputted to the decoder 2, the decoder 2 outputs a decoded picture signal D10 shown in FIG. 7B. In this decoded picture signal D10, the space between the I-picture (or P-picture) and the P-picture (i.e., the value of M), among the pictures aligned in order of display has been changed from M=3 into M=5 on the way, by prescribed editing before being inputted to the decoder 2.

If such decoded picture signal D10 is inputted to the encoder 20 (FIG. 6), (FIG. 7C), the encoder 20 encodes each picture of the decoded picture signal D10 according to any type of the I-picture, P-picture and B-picture based on the picture coding type information D40 supplied from the decoder 2, as described above with reference to FIGS. 4 and 6.

As a result, the bit stream D34 shown in FIG. 7D is outputted at a timing delayed for three frames from the input signal (decoded picture signal D10) from the encoder 20. At this time, in the encoder 20 for encoding a picture signal having the GOP structure with M=3, there is a problem that the capacity of a memory (picture sequence rearranging part 23) for storing the B-picture lacks when the GOP structure of the picture signal is changed into M=5.

That is, in the case of FIG. 7D, the encoder 20 needs to rearrange each picture so that the P-picture (picture P8) follows two B-pictures (pictures B1 and B2) with respect to the inputted decoded picture signal D10, encode the P-picture (picture P8) which is to be the reference of four B-pictures (pictures B4, B5, B6 and B7) in M=5 prior to these four B-pictures (pictures B4, B5, B6 and B7), and store them in the frame memory 30 (FIG. 6) as reference pictures.

As the above, when performing such rearranging that the P-picture (picture P8) is moved before the four B-pictures (pictures B4, B5, B6 and B7), the picture sequence rearranging part 23 of which the memory is insufficient to store the four B-pictures is broken.

As one of methods to solve the above problem, a method of increasing the memory capacity of the picture sequence rearranging part 23 can be considered. In this case, however, if the header of the GOP of the decoded picture signal D10 (FIG. 7C) is M=3 but it is changed into M=5 on the way, the encoder 20 cannot predict the change of the GOP structure. Therefore, the bit stream D34 (FIG. 7D) is started to be outputted in the state where it delays for three frames from the input of the decoded picture signal D10. However, there is a problem that if the encoder 20 tries to output the picture P8 succeeding the output of the picture B2 based on the picture coding type information D40 (FIG. 6) supplied from the decoder 2, the encoder 20 cannot encode and output the picture P8 because the output of the bit stream D34 has been started already at this time with the three frames delay.

Moreover, according to the reencoding method described above with reference to FIGS. 4 and 6, there is a problem that a delay time owing to reencoding becomes longer because the delay time that is the sum of a delay time in the decoder 2 (one frame delay) and a delay time in the encoder 20 (three frame delay, in case of M=3) is generated.

SUMMARY OF THE INVENTION

In view of the foregoing, an object of this invention is to provide a picture data processor, a picture data decoder and a picture data encoder, and methods thereof, that can surely perform reencoding without delaying irrespective of the construction of a bit stream when the bit stream is once decoded and further reencoded.

The foregoing object and other objects of the invention have been achieved by the provision of a picture data processor, a picture data decoder and a picture data encoder, and methods thereof, in which decoding means outputs decoded picture data in order of decoding without rearranging the decoded picture data in order of display, and transmits this to encoding means; and encoding means encodes the inputted decoded picture data in order of input.

Thereby, coded data inputted to a picture data processor composed of the decoding means and encoding means can be surely decoded and reencoded without delaying.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A to 5D are schematic diagrams showing the input/output state of pictures to/from the picture data encoder and the picture data decoder;

DETAILED DESCRIPTION OF THE EMBODIMENT

Figure 8:
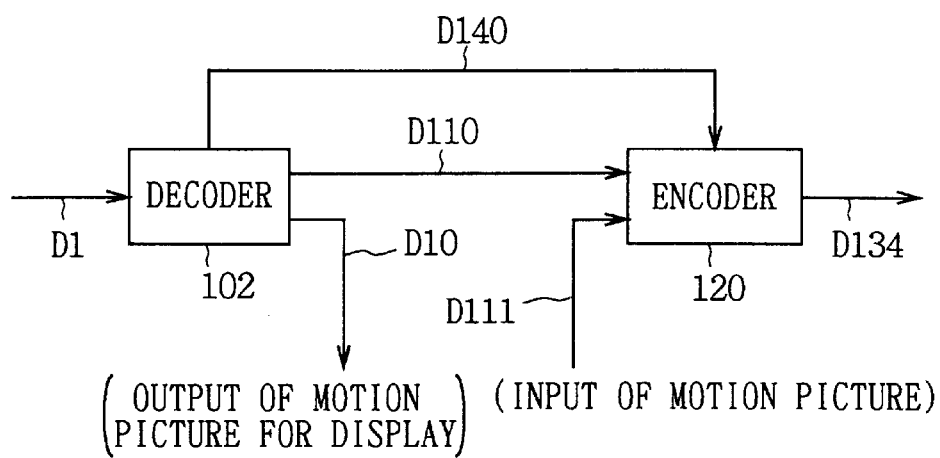
FIG. 8 is a block diagram showing the configuration of a picture data picture processor according to the present invention.

Preferred embodiments of the present invention will be described with reference to the accompanying drawings:

Referring to FIG. 8, a decoding and encoding apparatus 100 as a picture data processor temporarily decodes a bit stream D1 that has been subjected to compression coding by the moving picture experts group (MPEG) standard with a decoder 102, and reencodes the decoded picture signal D110 with an encoder 120, to obtain a bit stream D134.

Figure 1:
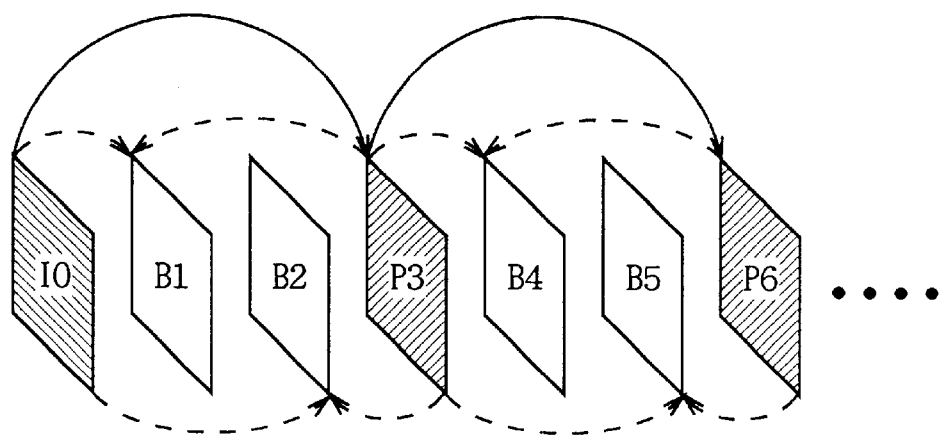
FIG. 1 is a schematic diagram showing the construction of a GOP picture.
Figure 2:
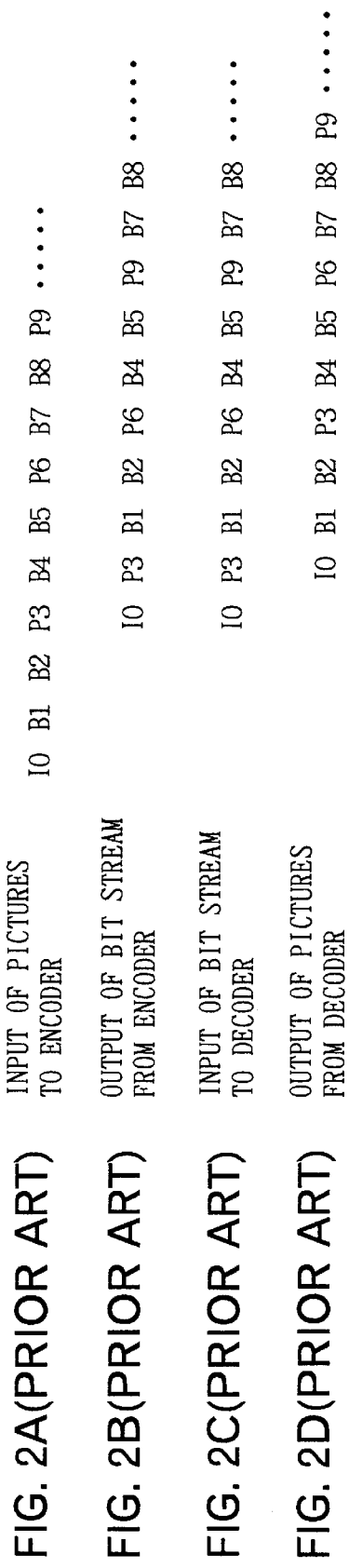
FIGS. 2A to 2D are schematic diagrams showing the input/output state of pictures to/from a picture data encoder and a picture data decoder.
Figure 3:
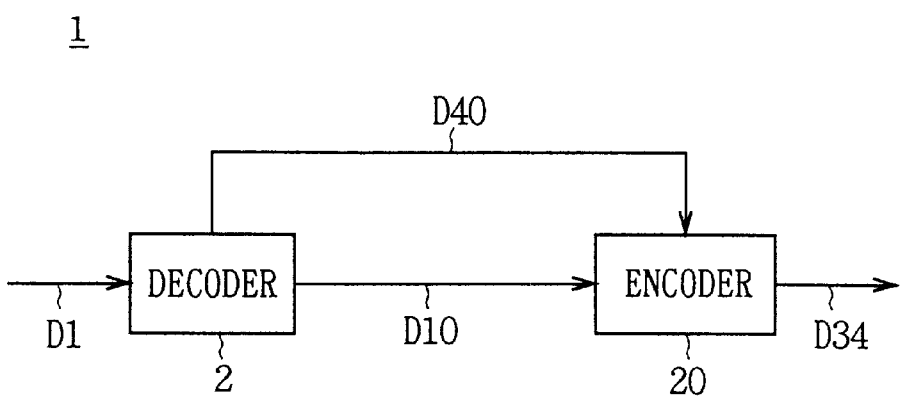
FIG. 3 is a block diagram showing the general configuration of a decoding and encoding apparatus.
Figure 4:
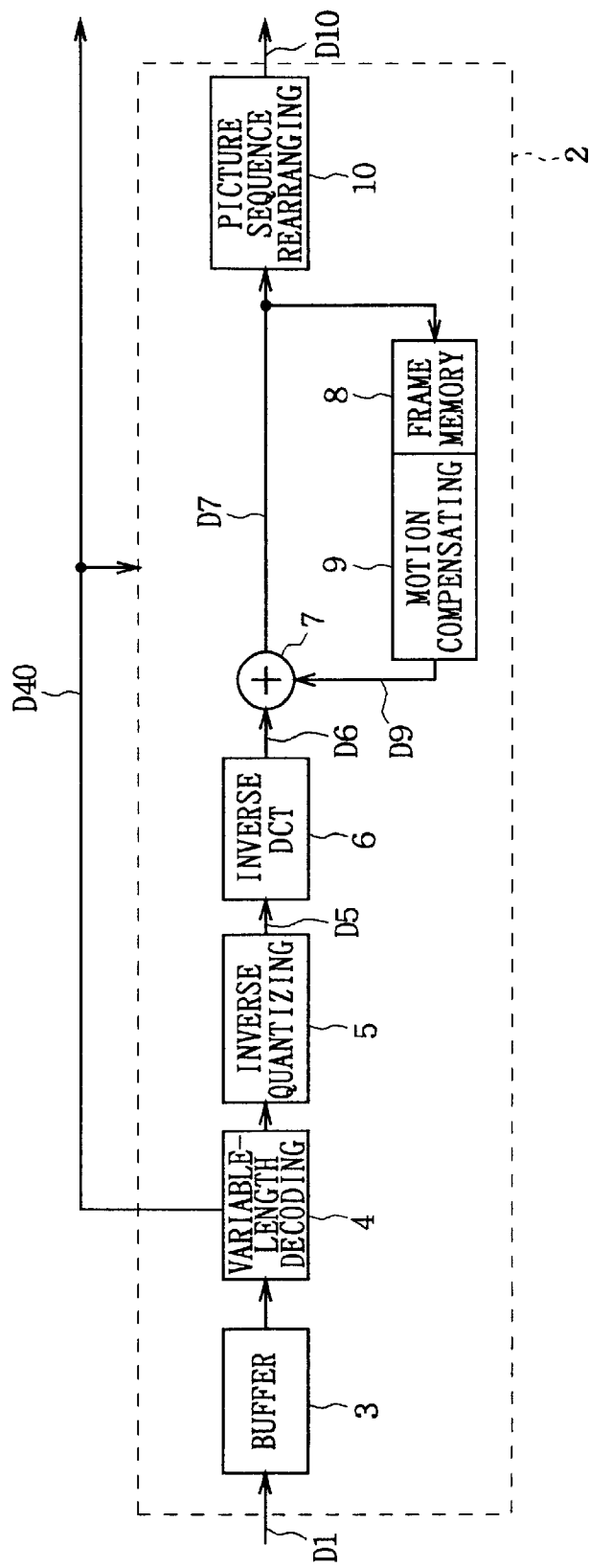
FIG. 4 is a block diagram showing the configuration of a conventional picture data decoder.
Figure 6:
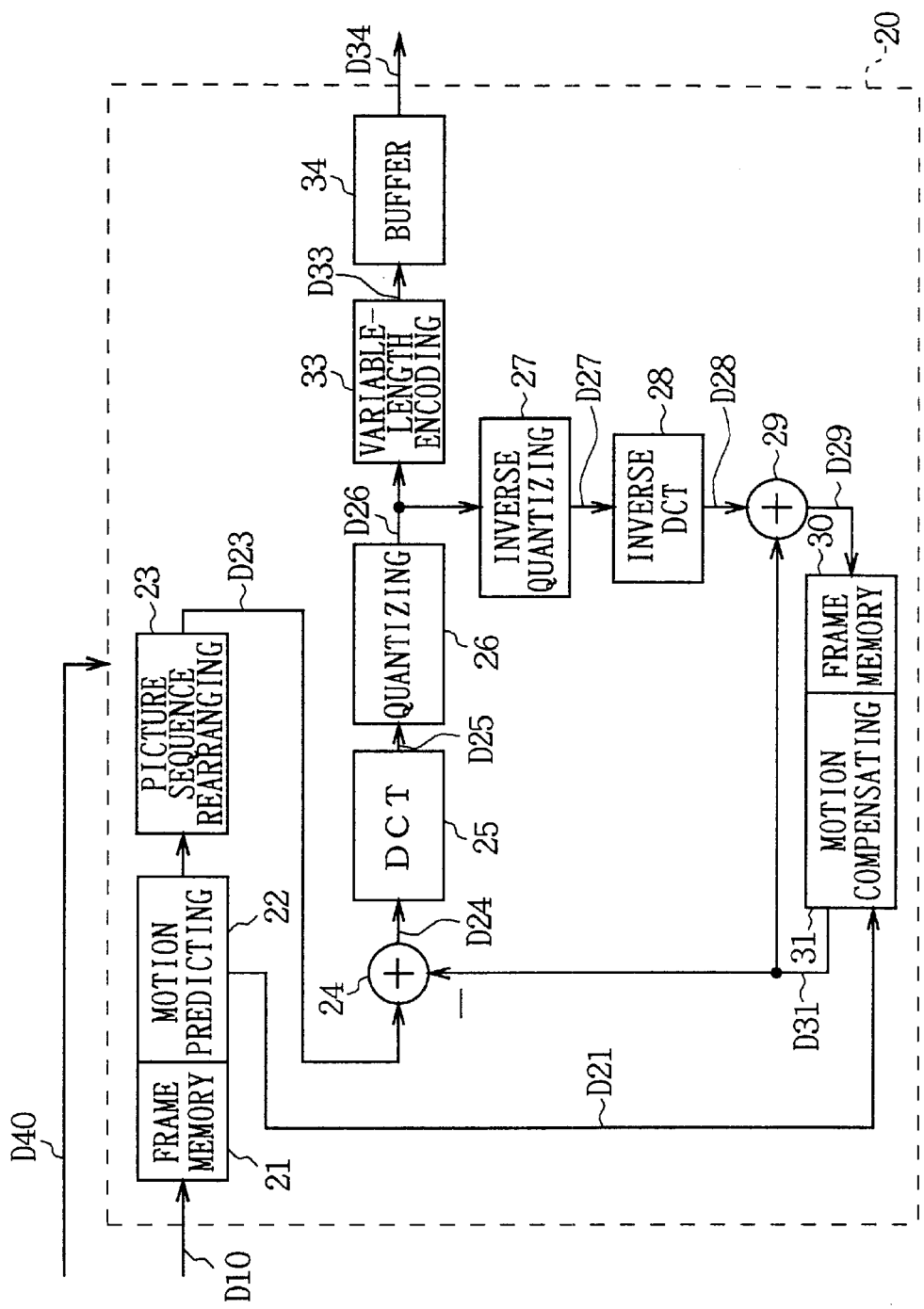
FIG. 6 is a block diagram showing the configuration of a conventional picture data encoder.
Figure 7:
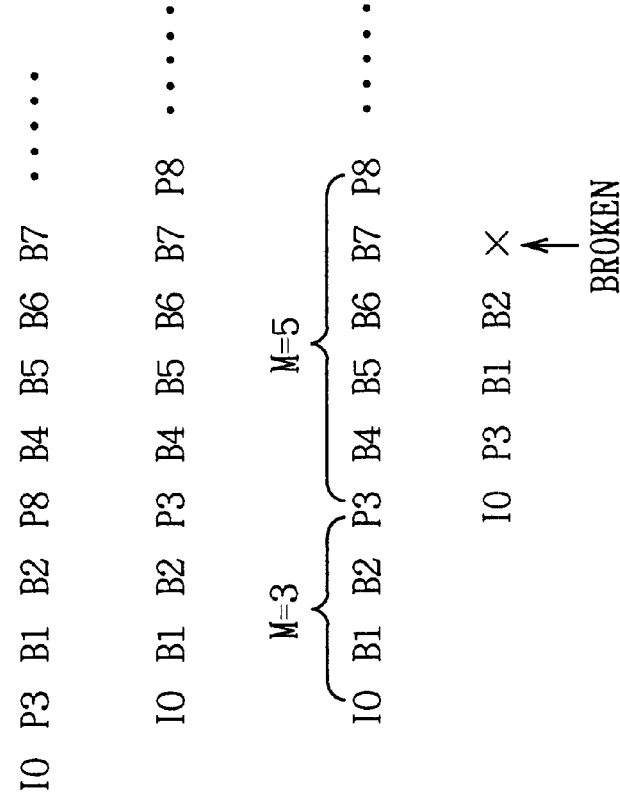
FIGS. 7A to 7D are schematic diagrams explaining a problem accompanying with a change of GOP structure.
Figure 9:
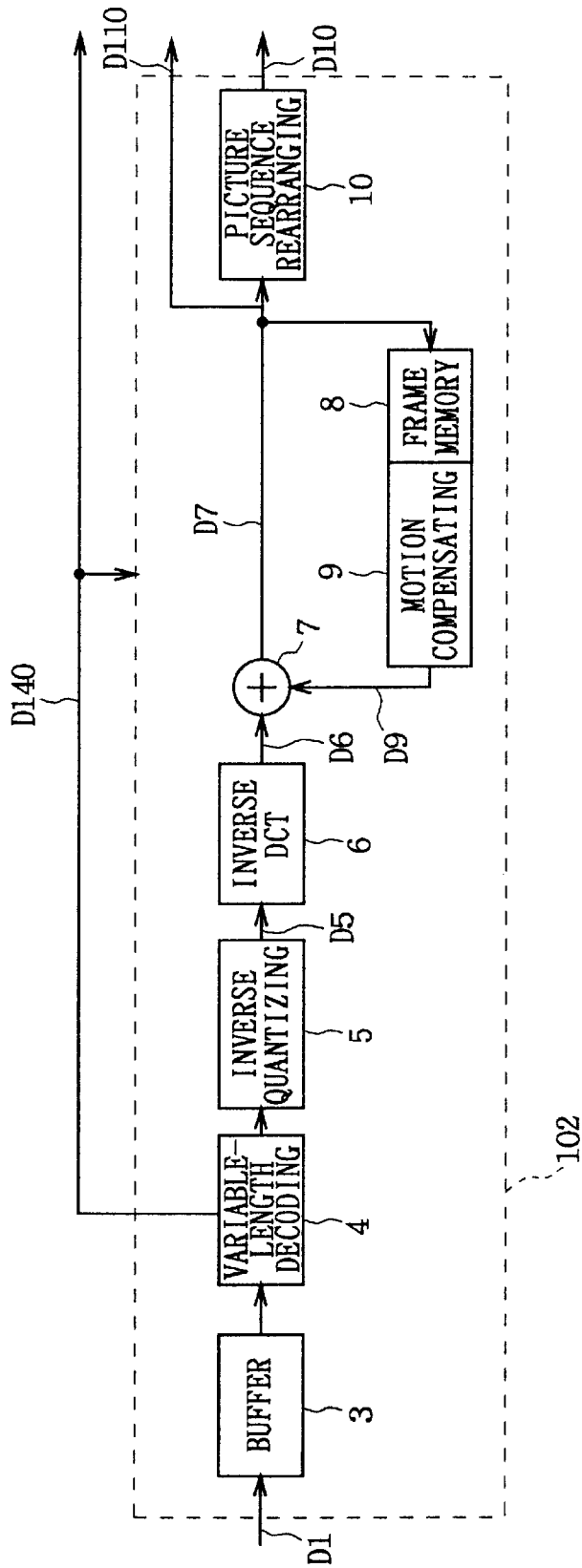
FIG. 9 is a block diagram showing the configuration of a picture data decoder according to the present invention.

FIG. 9 in which the same reference numerals are added to corresponding parts of FIG. 4 shows the configuration of the decoder 102 as decoding means. The decoder 102 inputs the inputted bit stream D1 to a variable-length decoding part 4 via a buffer 3. The variable-length decoding part 4 performs variable-length decoding on the bit stream D1, and supplies this to an inverse quantizing part 5. The inverse quantizing part 5 performs inverse quantizing on the output of the variable-length decoding part 4 and restoring a discrete cosine transform (DCT) coefficient sequence D5. This is subjected to inverse DCT processing in an inverse DCT part 6. Thereby, difference data corresponding to a picture type is outputted from the inverse DCT part 6 to an arithmetic part 7.

Here, if decoding the I-picture first inputted as the bit stream D1, picture data for one frame is outputted from the inverse DCT part 6 since the I-picture is data intra-frame-coded. This picture data is supplied to a following picture sequence rearranging part 10 as decoded picture data D7 as well as being stored in a frame memory 8 as reference picture data.

A motion compensating part 9 performs motion compensating on the reference picture data stored in the frame memory 8 based on motion vector information (not shown in figure) transmitted together with the bit stream D1 from the encoder, and supplies this to the arithmetic part 7 as predictive picture data D9.

The arithmetic part 7 adds difference data D6 outputted from the inverse DCT part 6 to the predictive picture data D9, to obtain the decoded picture data D7 of a new frame (picture). This decoded picture data D7 is stored in the frame memory 8 as reference picture data and is to be a reference picture for the following frame (picture).

Figure 10:
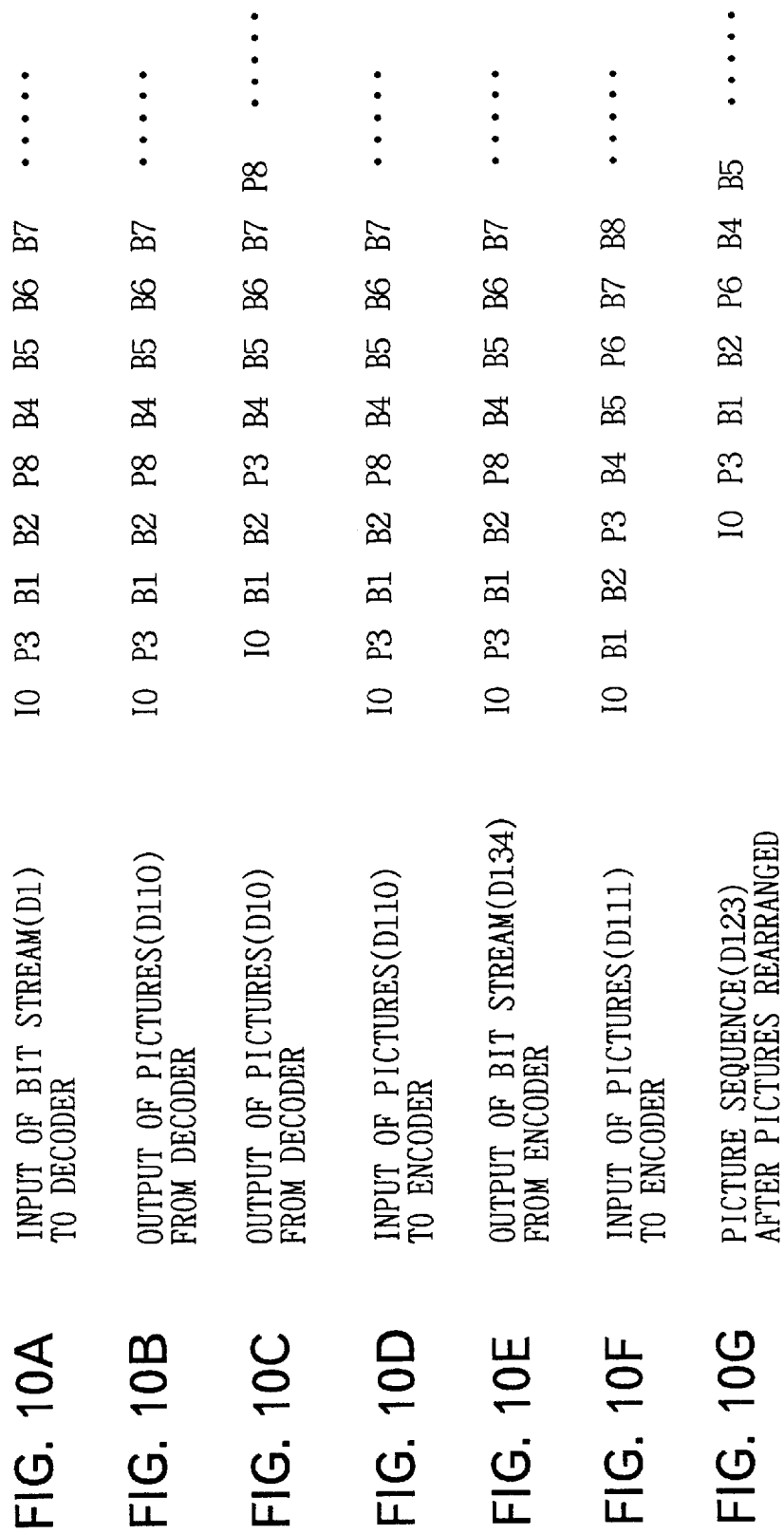
FIGS. 10A to 10G are schematic diagrams showing the construction of input/output data to/from the picture data decoder and a picture data encoder according to the present invention.

In this connection, if the bit stream D1 shown in FIG. 10A is inputted to the decoder 102, a picture P3 is restored referring to a picture IO previously-decoded as a reference picture, and pictures B1 and B2 are restored referring to the pictures IO and P3 previously-decoded as reference pictures. In FIGS. 10A to 10G, a number added to each picture type (I, P, B) represents a display sequence.

Each of the pictures forming the bit stream D1 is decoded as the decoded picture data D7 in this manner, and then it is supplied to the frame memory 8 as well as being supplied to the encoder 120 (FIG. 8) as a decoded picture signal D110 (FIG. 10B) remaining the decoding order without being passed through the picture sequence rearranging part 10. In this connection, the decoded picture signal D110, which has not been rearranged, in the decoding order cannot be displayed on a monitor or the like, because it is not in the display order. Therefore, if displaying the picture decoded in the decoder 102 on the monitor or the like, the decoder 102 supplies the decoded picture data D7 outputted from the arithmetic part 7 to the picture sequence rearranging part 10 to rearrange this in order of display and obtain the decoded picture signal D10 with one frame delay shown in FIG. 10C. The picture sequence rearranging part 10 supplies the decoded picture signal D10 to the monitor (not shown in figure) to display this as a picture.

Here, the variable-length decoding part 4 of the decoder 102 supplies information defined by the MPEG2 standard, such as header information on a sequence layer, header information on a picture layer, motion vector information, DCT type, and quantization scale, among information added to the inputted bit stream D1, to the encoder 120 (FIG. 8) as coding parameter information D140. More particularly, as the header information of the picture layer, the picture coding type (I-picture, P-picture, B-picture) of each picture is supplied to the encoder 120. The encoder 120 encodes the decoded picture signal D110 into the same picture type as the picture type when it has been coded in the bit stream D1, according to the picture coding type.

Figure 11:
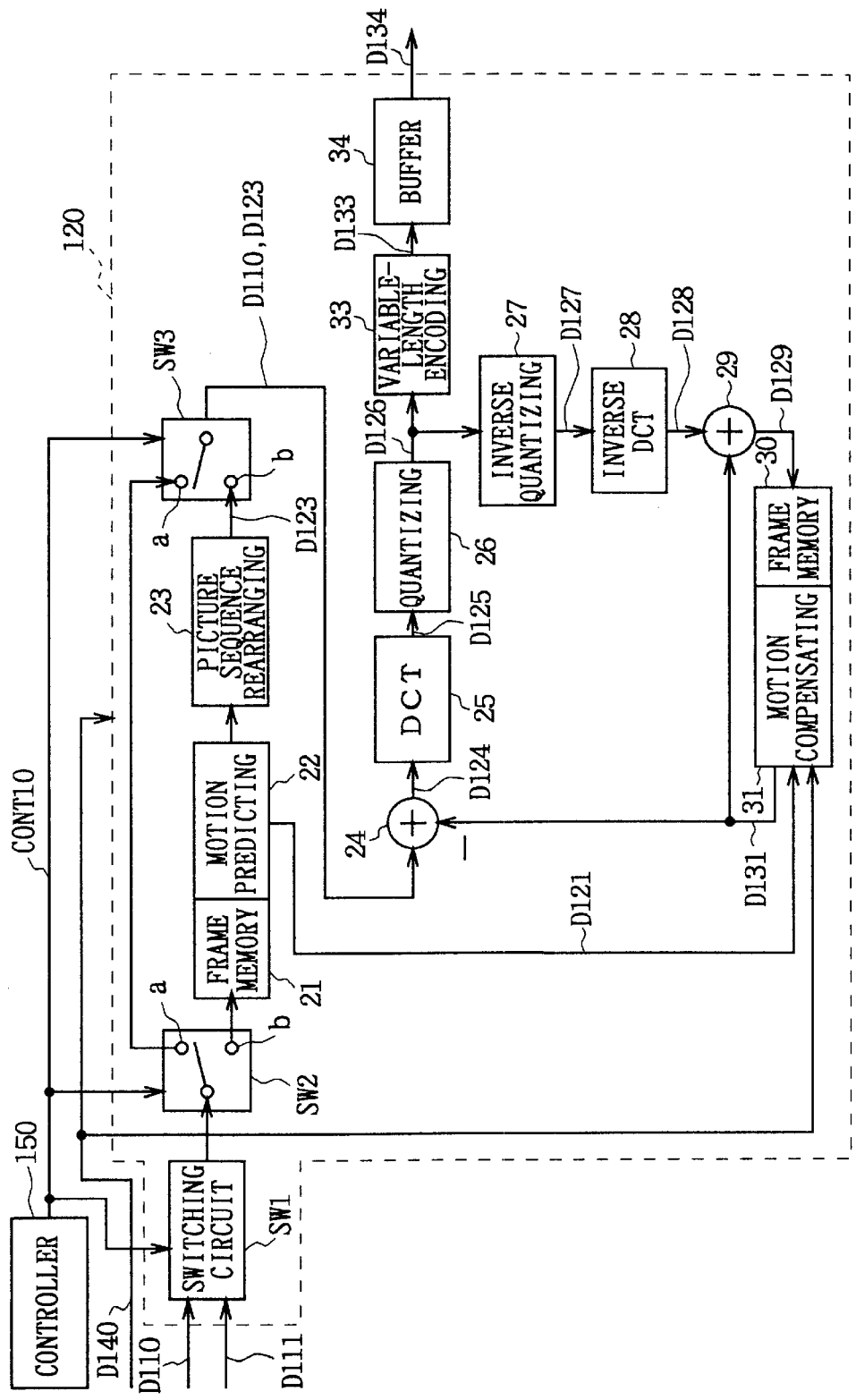
FIG. 11 is a block diagram showing the configuration of the picture data encoder according to the present invention.

FIG. 11 shows the configuration of the encoder 120 as encoding means. Specifically, the decoded picture signal D110 outputted from the decoder 102 (FIG. 9) is inputted to the switching circuit SW1 of the encoder 120. The switching circuit SW1 selects either the decoded picture signal D110 supplied from the decoder 102 or an external input picture signal D111 supplied from the outside by a control signal CONT10 supplied from a controller 150. In this connection, in the decoded picture signal D110 pictures are being aligned in order of decoding by the decoder 102 as shown in FIG. 10D, while in the external input picture signal D111 supplied from the outside frames (pictures) are being aligned in the displaying order as shown in FIG. 10F.

When the controller 150 selects the decoded picture signal D110 by controlling the switching circuit SW1, it controls switching circuits SW2 and SW3 to be switched to their first input terminal (a) according to this selection. Thereby, the decoded picture signal D110 in which the pictures are being aligned in the decoding order is directly supplied to an arithmetic part 24 without passing a frame memory 21, a motion predicting part 22 and a picture sequence rearranging part 23.

At this time, the motion compensating part 31 of the encoder 120 inputs the coding parameter information D140 supplied from the decoder 102, and performs motion compensating processing on a reference picture stored in a frame memory 30 using motion vector information included in the coding parameter information D140. Predictive picture data D131 obtained by this motion compensating processing is supplied to the arithmetic part 24.

The arithmetic part 24 calculates a difference between the decoded picture data D110 and the predictive picture data D131 supplied from the motion compensating part 31. This difference data D124 is supplied to a DCT part 25 to be subjected to the discrete cosine transform (DCT) processing. Thus, the DCT part 25 generates a DCT coefficient sequence D125 by the DCT processing, and supplies this to a quantizing part 26. The quantizing part 26 quantizes the DCT coefficient sequence D125, and generating quantized data D126, supplies this to a variable-length encoding part 33 and an inverse quantizing part 27.

The inverse quantizing part 27 restores the quantized data D126 to a DCT coefficient sequence D127 by performing the inverse quantization processing. The DCT coefficient sequence D127 is further supplied to an inverse DCT part 28 to be subjected to inverse DCT processing. The inverse DCT part 28 restores the DCT coefficient sequence D127 to difference data D128 according to the picture type, and outputs this to an arithmetic part 29.

The arithmetic part 29 adds the predictive picture data D131 outputted from the motion compensating part 31 to the difference data D128, and generating reference picture data D129, stores this in the frame memory 30.

In this manner, the difference data quantized via the DCT part 25 and the quantizing part 26 is restored by the inverse quantizing part 27 and the inverse DCT part 28 as the difference data D128. This is added to the predictive picture data D131 in the arithmetic part 29 and is to be the reference picture data D129. Thereby, a reference picture for the following frame (picture) is prepared in the frame memory 30.

Here, the encoder 120 detects a coding picture type as to the picture of the decoded picture signal D110 inputted at this time by picture coding type information included in the picture layer header information of the coding parameter information D140 supplied from the decoder 102 (FIG. 9), and encodes the corresponding frame (picture) of the decoded picture signal D110 according to the picture type.

That is, each frame of the decoded picture signal D110 outputted from the decoder 102 has been encoded by any picture type of the I-picture, P-picture and B-picture, before being decoded in the decoder 102. This picture type is inputted to the encoder 120 at the time of the decoding processing in the decoder 102 by being included in the coding parameter information D140 together with a corresponding frame number as picture coding type information.

Thus, the encoder 120 obtains the picture type information corresponding to each frame of the inputted decoded picture signal D110, and performs encoding according to the picture type. For instance, if a picture type specified for the frame of the inputted decoded picture signal D110 is the I-picture, the control part of the encoder 120 (not shown in figure) performs the encoding processing in an intramode on each of macro blocks forming the frame of the decoded picture signal D110.

That is, in the intramode, the arithmetic part 24 transmits the decoded picture signal D110, which is directly inputted via the switching circuits SW1, SW2 and SW3, to the DCT part 25 as it is. Accordingly, the difference data D128 outputted via the DCT part 25, quantizing part 26, inverse quantizing part 27 and inverse DCT part 28 becomes picture data for one frame (picture). This is added to the predictive picture data D131 supplied from the motion compensating part 31, and stored in the frame memory 30 as reference picture data.

At this time, the quantized data D126 of the I-picture outputted from the quantizing part 26 is supplied to the variable-length encoding part 33. The variable-length encoding part 33 performs variable-length encoding processing on the quantized data D126 using a prescribed conversion table, and generating variable-length coded data D133, supplies this to a buffer 34. The buffer 34 outputs the variable-length-coded data D133 at a prescribed bit rate.

Thus, a bit stream D134 at the prescribed bit rate is outputted from the encoder 120. As a result, the decoded picture signal D110 inputted to the encoder 120 is reencoded into the picture type (I-picture) before being decoded in the decoder 102 provided prior to the encoder 120, and the reencoded data is outputted.

If the picture type specified for the decoded picture signal D110 inputted to the encoder 120 is the P-picture, the control part of the encoder 120 (not shown in figure) performs encoding processing in a forward-directionally predictive mode on each of the macro blocks forming the frame of the decoded picture signal D110.

Specifically, in the forward-directionally predictive mode, the arithmetic part 24 performs subtraction calculation on the decoded picture signal D110 directly inputted via the switching circuits SW1, SW2 and SW3, using the forward-directional predictive picture data D131 supplied from the motion compensating part 31. The forward-directional predictive picture data D131 is calculated by performing the motion compensating on the reference picture data composed of the I-picture or P-picture stored in the frame memory 30, based on the picture type information included in the coding parameter information D140. In this manner, the arithmetic part 24 calculates the difference between the forward-directional predictive picture data D131 generated based on the I-picture (or P-picture) stored in the frame memory 30 and the decoded picture signal D110, and generating difference data forming the P-picture, transmits this to the DCT part 25.

At this time, the quantized data D126 of the P-picture outputted from the quantizing part 26 is outputted via the variable-length encoding part 33 and the buffer 34 as the bit stream D134. Thereby, the decoded picture signal D110 inputted to the encoder 120 is reencoded into the picture type (P-picture) before being decoded in the decoder 102 provided prior to the encoder 120, and the reencoded data is outputted.

If the picture type specified for the decoded picture signal D110 inputted to the encoder 120 is the B-picture, the control part of the encoder 120 (not shown in figure) performs coding processing in a bidirectionally predictive mode on each of the macro blocks forming the frame of the decoded picture signal D110.

That is, in the bidirectionally predictive mode, the arithmetic part 24 performs the subtraction calculation on the decoded picture signal D110 directly inputted via the switching circuits SW1, SW2 and SW3, using the bidirectionally predictive picture data D131 supplied from the motion compensating part 31. The bidirectionally-predictive picture data D131 are calculated by referring to pictures in the past and the future (I-picture or P-picture) with respect to a frame to be coded at this time as reference pictures and by performing the motion compensating on the reference picture data stored in the frame memory 30 based on the picture type information included in the coding parameter information D140. Then, the arithmetic part 24 subtracts the mean value of predictive picture data in the forward direction and the reverse direction generated based on the past I-picture or P-picture and the future I-picture or P-picture stored in the frame memory 30, and obtaining difference data D124 as a predictive residual, transmits this to the DCT part 25.

At this time, the quantized data D126 of the B-picture outputted from the quantizing part 26 is outputted via the variable-length encoding part 33 and the buffer 34 as the bit stream D134. Thereby, the decoded picture signal D110 to be inputted to the encoder 120 is reencoded into the picture type (B-picture) before being decoded in the decoder 102 provided prior to the encoder 120, and the reencoded data is outputted.

In this manner, the decoded picture signal D110 supplied from the decoder 102 to the encoder 120 (FIG. 10D), as shown in FIG. 10E, is encoded into the picture type based on the picture type information of the coding parameter information D140, and the encoded data is outputted as the bit stream D134. Accordingly, even if each of the pictures forming the bit stream D1 inputted to the decoder 102 described above with FIG. 9 is once decoded in the decoder 102 and then reencoded in the encoder 120, it has the same picture type, and the deterioration of image quality owing to reencoding can be avoided.

In this embodiment, since the decoded picture signal D110 supplied from the decoder 102 to the encoder 120 is inputted to the encoder 120 remaining the order of decoding in the decoder 102, it is unnecessary to rearrange the picture sequence of the decoded picture signal D110 in the encoder 120. Therefore, the decoded picture signal D110 can be outputted as the bit stream D134 without generating a delay owing to the picture rearrangement.

In this connection, in the external input picture signal Dill inputted from the outside to the encoder 120, as described above with reference to FIG. 10F, frames (pictures) are aligned in the display order. Accordingly, if selecting the external input picture signal D111 by controlling the switching circuit SW1, the controller 150 switches the switching circuits SW2 and SW3 to their second input terminals (b). Thereby, the external input picture signal D111 in which the frames (pictures) are aligned in the displaying order is temporarily stored in the frame memory 21. The motion predicting part 22 detects motion vector information D121 between two of the frames (pictures) stored in the frame memory 21, and supplies this to the motion compensating part 31.

The motion compensating part 31 performs the motion compensating processing on a reference picture stored in the frame memory 30 at this time, using the motion vector information D121, and generating predictive picture data D131, supplies this to the arithmetic part 24.

Moreover, the picture data of each picture of the external input picture signal D111 in which the motion vector has been detected by the motion predicted part 22 is supplied to the picture sequence rearranging part 23. The picture sequence rearranging part 23 rearranges pictures of the external input picture signal D111 so as to form such a picture sequence that the I-picture (picture IO) and P-picture (picture P3) to be references for the B-pictures (pictures B1 and B2) can be encoded before these B-pictures.

FIG. 10G shows the result (picture signal D123) that the external input picture signal D111 (FIG. 10F) has been rearranged in order of encoding in the picture sequence rearranging part 23. In this picture signal D123, a delay time (for three frames) necessary for rearranging the pictures in the picture sequence rearranging part 23 is generated.

The picture signal D123 in which the pictures have been rearranged in this manner is subjected to predictive coding according to the picture type in the arithmetic part 24, DCT part 25, quantizing part 26, inverse quantizing part 27, inverse DCT part 28, arithmetic part 29, frame memory 30 and motion compensating part 31, and thus obtained picture data is outputted via the variable-length encoding part 33 and buffer 34.

In the above structure, the bit stream D1 inputted to the decoder 102 (FIG. 10A) is outputted as the decoded picture signal D110 (FIG. 10B) remaining the order of decoding without changing the picture sequence. Therefore, in the decoder 102, the decoded picture signal D110 is outputted to the encoder 120 without occurring any delay therein because the pictures are not rearranged.

Here, since the order of decoding pictures in the decoder 102 equals to the order of encoding pictures in the following encoder 120, the decoded picture signal D110 (FIG. 10D) inputted to the encoder 120 remaining the decoding order does not need its picture rearrangement in the encoder 120. Accordingly, the encoder 120 encodes the inputted decoded picture signal D110 according to each picture type without picture rearrangement.

Therefore, also in the encoder 120, the decoded picture signal D110 can be encoded and outputted without delaying because the pictures are not rearranged.

Thus, in the decoding and encoding apparatus 100 (FIG. 8) composed of the decoder 102 and the encoder 120, a delay due to picture rearrangement can be avoided when the bit stream D1 is decoded and then reencoded.

Since the encoder 120 does not rearrange the pictures of the decoded picture signal D110, it does not store the pictures necessary for the picture rearrangement. Accordingly, as the GOP structure of the decoded picture signal D110, for instance, even if a space M between the I-picture (or P-picture) and P-picture is changed from M=3 into M=5 on the way, the inconvenience that the amount of data stored in the picture rearrangement increases as a conventional case can be avoided.

Moreover, since the picture rearranging is not performed, the bit stream D134 can be outputted at the same timing without any delay irrespective of the space M between the I-picture (or P-picture) and P-picture. Thereby, outputting the bit stream D134 can be surely continued even if M changes.

In this manner, the encoder 120 can surely encode the decoded picture signal D110 to be encoded irrespective of its data structure.

According to the above construction, the decoding and encoding apparatus 100 can surely decode and reencode the bit stream D1 without a delay.

Note that, in the aforementioned embodiment, the data structure of the decoded picture signal D110 supplied from the decoder 102 to the encoder 120 is changed from M=3 into M=5 on the way. However, the present invention is not only limited to this but also can cope with various changes in data structure.

Further, in the aforementioned embodiment, an apparatus for decoding and encoding by the MPEG method has been described. However, the present invention is not only limited to this and can be applied to various encoding methods, as long as a bit stream rearranged and encoded for each prescribed data unit is decoded and reencoded without being restored for the data unit in decoding and reencoding.

According to the present invention as described above, original picture data in order of display is encoded in order of prescribed coding for each prescribed data unit by a prescribed coding type, so that encoded data in order of encoding is generated. The encoded data in order of encoding is decoded in order of encoding, and decoded picture data thus decoded is outputted in order of decoding and encoded in order of decoding. And reencoded data thus encoded is outputted in order of encoding. Thereby, the inputted encoded data can be surely decoded and reencoded without delaying.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A picture data processor for decoding and re-encoding an encoded picture file comprising a plurality of I-type, P-type, and B-type frames sequenced in the order in which the frames were encoded and wherein the number of B-type frames between each I-type and P-type frame changes, comprising:

decoding means for decoding said plurality of frames from said encoded picture file into a decoded output stream having the same frame order;

first sequence rearranging means for resequencing the frame order of said decoded output stream into a display output stream for display;

second sequence rearranging means for resequencing the frame order of a display input stream of a picture file having a frame order sequenced for display into a display input stream having a frame order sequenced for encoding;

switching means for switching an input stream to a re-encoding means between said decoded output stream and said display input stream; and said re-encoding means for re-encoding said input stream from said switching means into a re-encoded picture file having frames sequenced in the order in which the frames were re-encoded.

2. The picture data processor according to claim 1, wherein when said input stream corresponds to said decoded output stream said decoding means supplies coding type information which represents a coding type for each of said plurality of frames from said encoded picture file to said re-encoding means; and said re-encoding means re-encodes each of said plurality of frames from said input stream according to said coding type information supplied from said decoding means.

3. The picture data processor according to claim 1, wherein said encoded and re-encoded picture files are encoded in MPEG format; the I-type frames correspond to intra-frame coded pictures, the P-type frames correspond to inter-frame forward predictive coded pictures, and the B-type frames correspond to bi-directional predictive coded pictures.

4. A method of picture data processing for decoding and re-encoding an encoded picture file comprising a plurality of I-type, P-type, and B-type frames sequenced in the order in which the frames were encoded and wherein the number of B-type frames between each I-type and P-type frame changes, comprising the steps of:

decoding said plurality of frames from said encoded picture file into a decoded output stream having the same frame order;

resequencing the frame order of said decoded output stream into a display output stream for display;

resequencing the frame order of a display input stream of a picture file having a frame order sequenced for display into a display input stream having a frame order sequenced for encoding;

switching an input stream to be re-encoded between said decoded output stream and said display input stream using a switching means; and re-encoding said input stream from said switching means into a re-encoded picture file having frames sequenced in the order in which the frames were re-encoded.

5. The method of picture data processing according to claim 4, wherein when said input stream corresponds to said decoded output stream said decoding step supplies coding type information which represents a coding type for each of said plurality of frames from said encoded picture file to said re-encoding step; and said re-encoding step re-encodes each of said plurality of frames from said input stream according to said coding type information supplied from said decoding step.

6. The method of picture data processing according to claim 4, wherein said encoded and re-encoded picture files are encoded in MPEG format; the I-type frames correspond to intra-frame coded pictures, the P-type frames correspond to inter-frame forward predictive coded pictures, and the B-type frames correspond to bi-directional predictive coded pictures.

* * * * *